Nov. 27, 1962

A. W. HINDENLANG 3,065,783

CONTROL VALVE FOR START UP AND SHUT DOWN
OF ATOMIZING OIL BURNERS

Filed Nov. 12, 1958

INVENTOR
Arthur W. Hindenlang
BY
C. F. Bryant
ATTORNEY

INVENTOR
Arthur W. Hindenlang
BY
*C. F. Bryant*
ATTORNEY

INVENTOR
Arthur W. Hindenlang
BY
*R. F. Bryant*
ATTORNEY

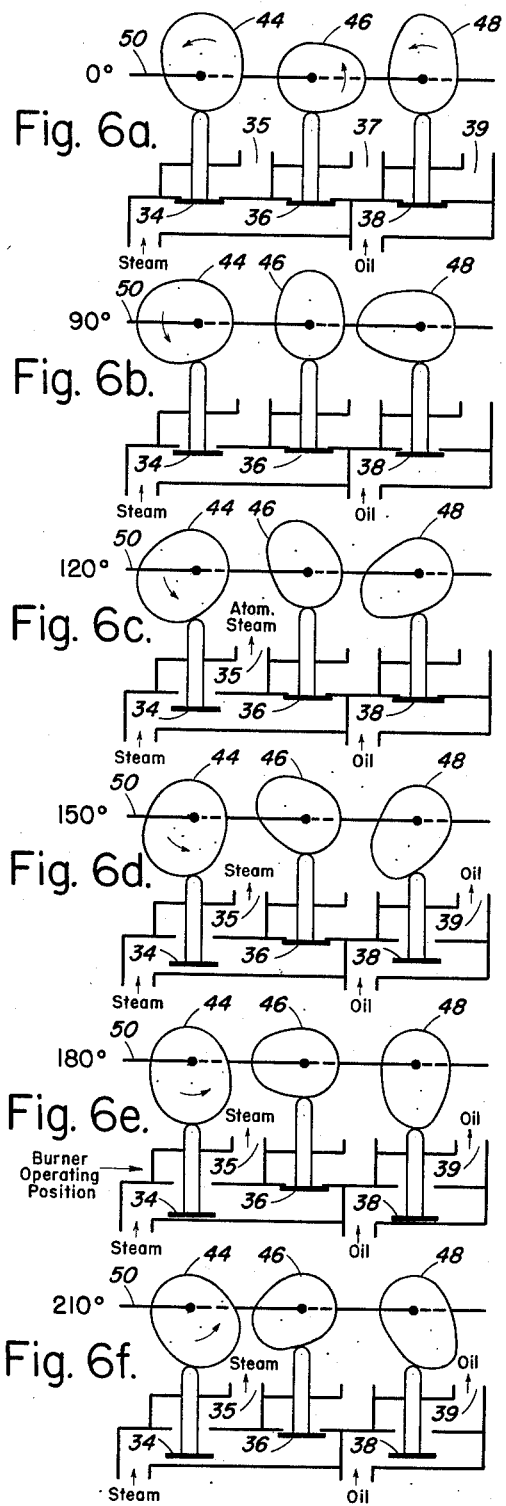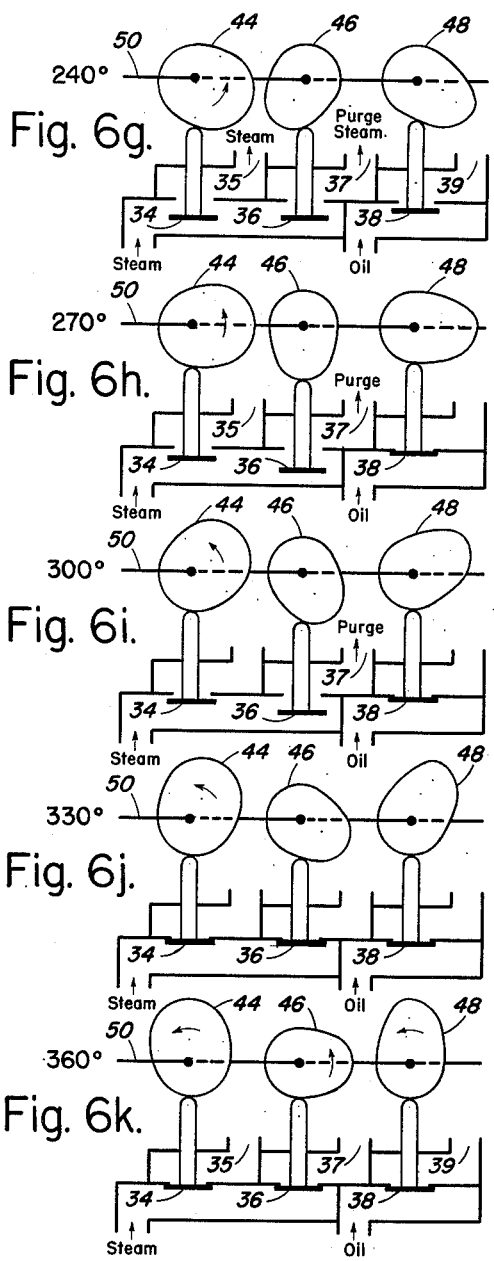

United States Patent Office 3,065,783
Patented Nov. 27, 1962

3,065,783
CONTROL VALVE FOR START UP AND SHUT DOWN OF ATOMIZING OIL BURNERS
Arthur W. Hindenlang, Freeport, N.Y., assignor to Combustion Engineering, Inc., New York, N.Y., a corporation of Delaware
Filed Nov. 12, 1958, Ser. No. 773,219
1 Claim. (Cl. 158—28)

My invention relates to the burning of fuel oil in heat-utilizing apparatus such as steam generating boilers of the "packaged" and other types, and it has special reference to control valve means for starting up and shutting down the oil burners of such apparatus when those burners are organized to atomize the oil that is introduced thereby into the combustion chamber of the apparatus.

Broadly stated, the object of my invention is to provide improved control valve facilities for starting up and shutting down oil burners that are used in environments such as referred to above and that are designed to atomize the introduced fuel oil by the aid of either steam or air.

A more specific object is to incorporate vital system safety features and operation safeguards into the valve means by which such atomizing oil burners are started up and shut down.

Another object is to replace the multiplicity of separate valves previously needed and used in an uncoordinated way by a novel unitary valve assemblage which performs all necessary functions of burner start up and shut down and which positively assures that these functions will be accomplished in the same given "safe" sequence at all times and under all circumstances.

An additional object is to incorporate new and highly useful ignition-proving safeguards into the atomizing burner installation with which my improved startup-and-shutdown facilities are utilized.

Other objects and advantages of the invention will become apparent from the following description of an illustrative embodiment thereof when taken in conjunction with the accompanying drawings wherein.

Figure 2:
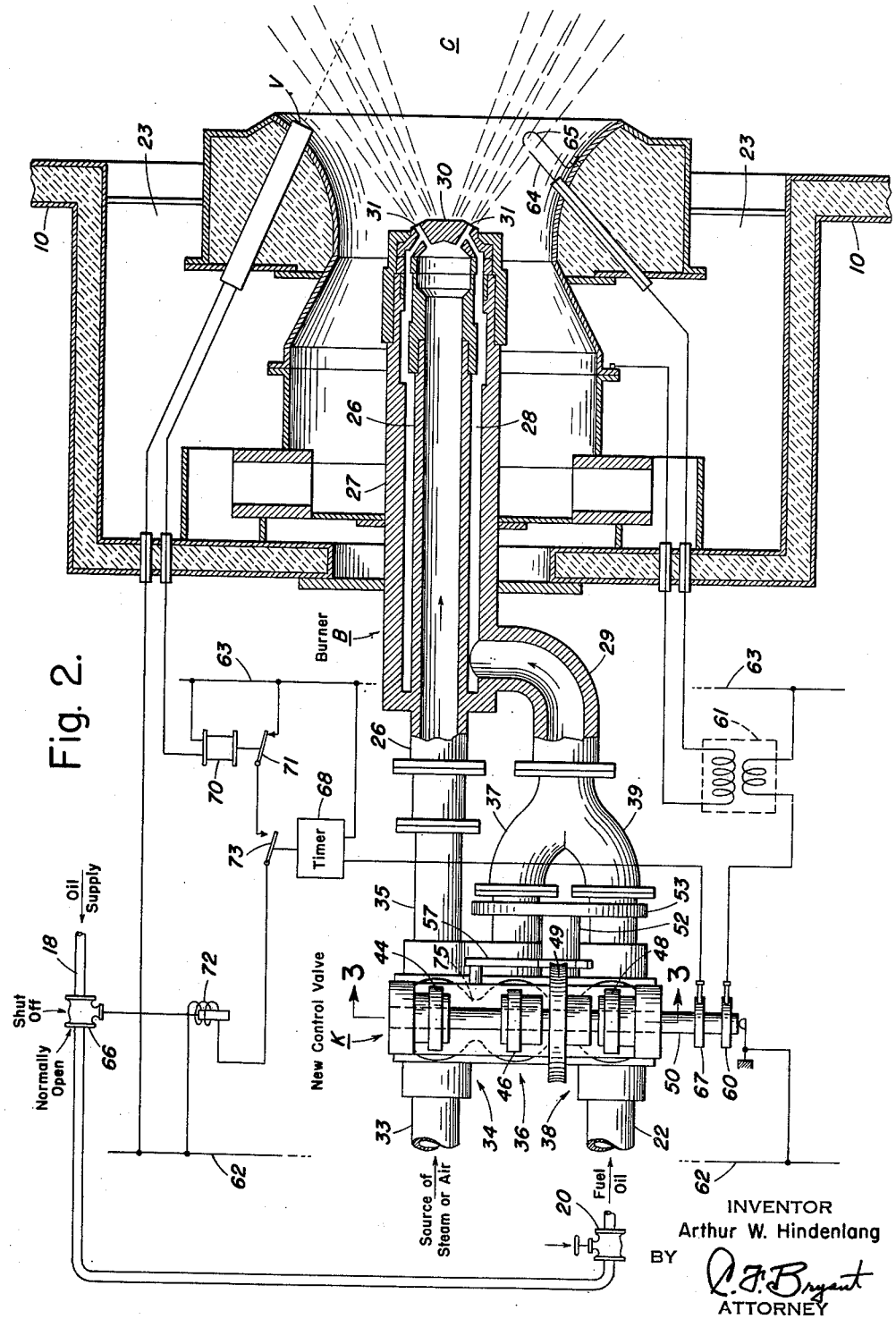
FIG. 2 is a view from line 2—2 of FIG. 1 giving an enlarged sectional showing of the FIG. 1 burner plus an enlarged top plan showing of my new control valve facilities for that burner.
Figure 3:
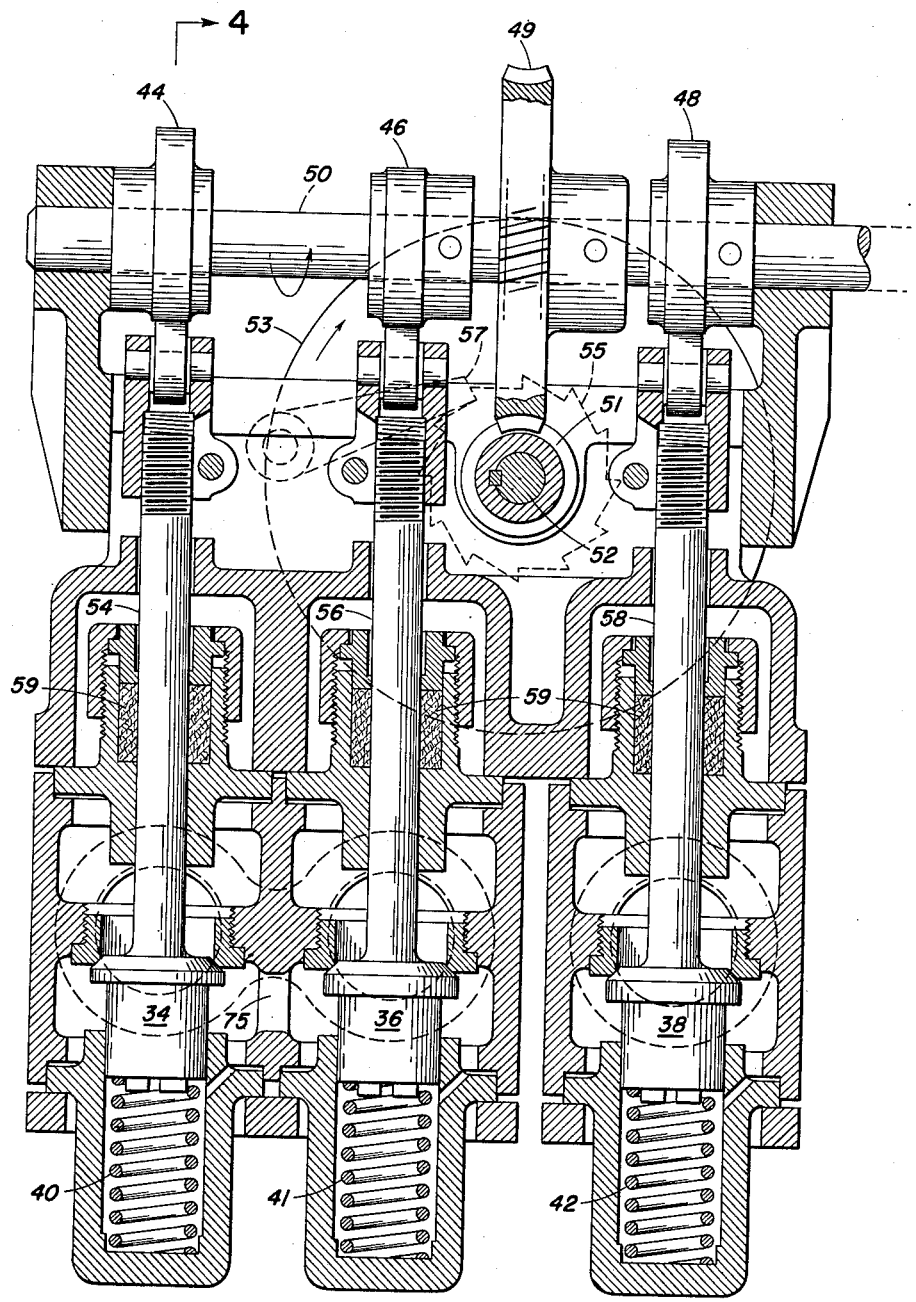
FIG. 3 is an enlarged sectional view on line 3—3 of FIG. 2 illustrating internal construction details for the three valve elements which are included in my new burner control assemblage and which respectively govern the flow of atomizing steam and of purging steam and of fuel oil into the FIG. 2 burner.
Figure 4:
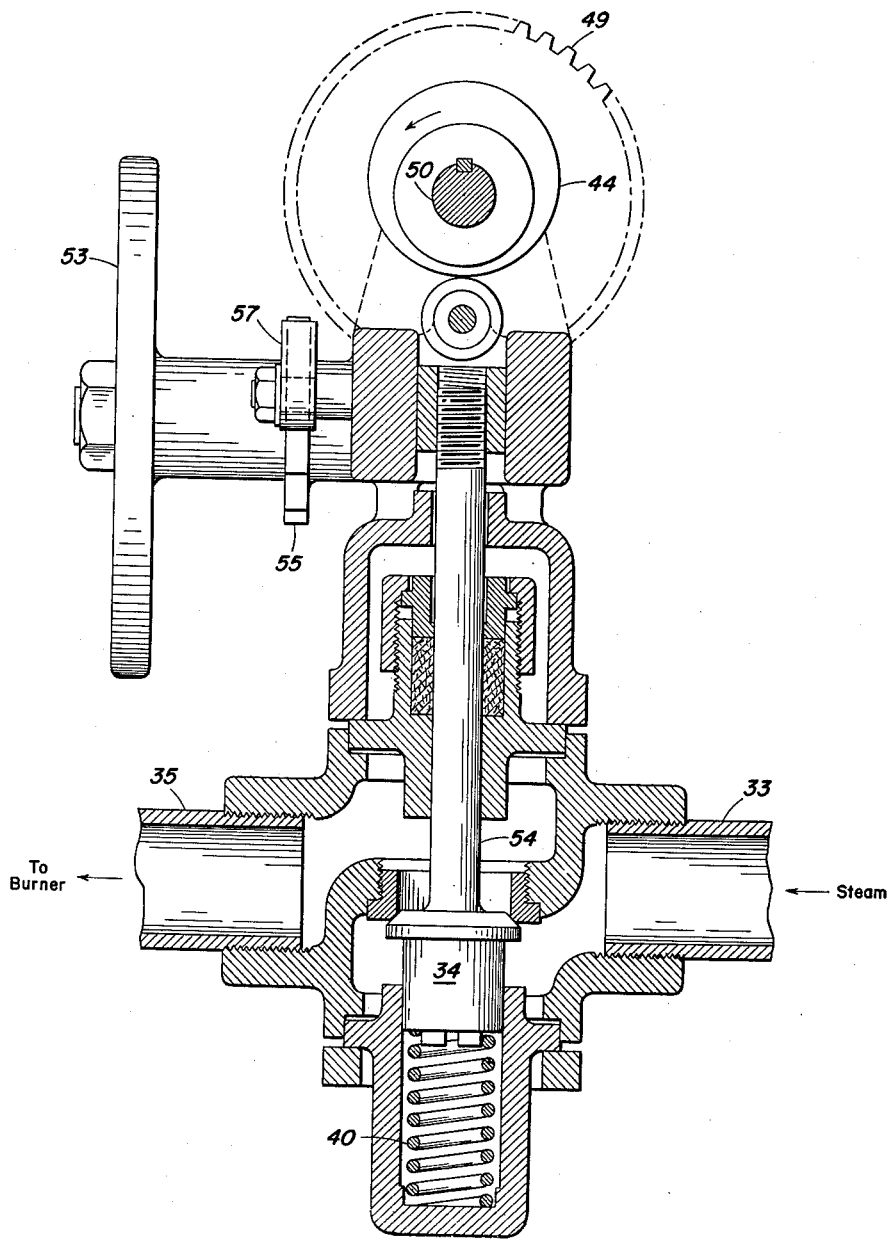
FIG. 4 is a section on line 4—4 of FIG. 3 showing further internal construction details for the atomizing steam control portion of my new three-element valve assemblage.
Figure 5:
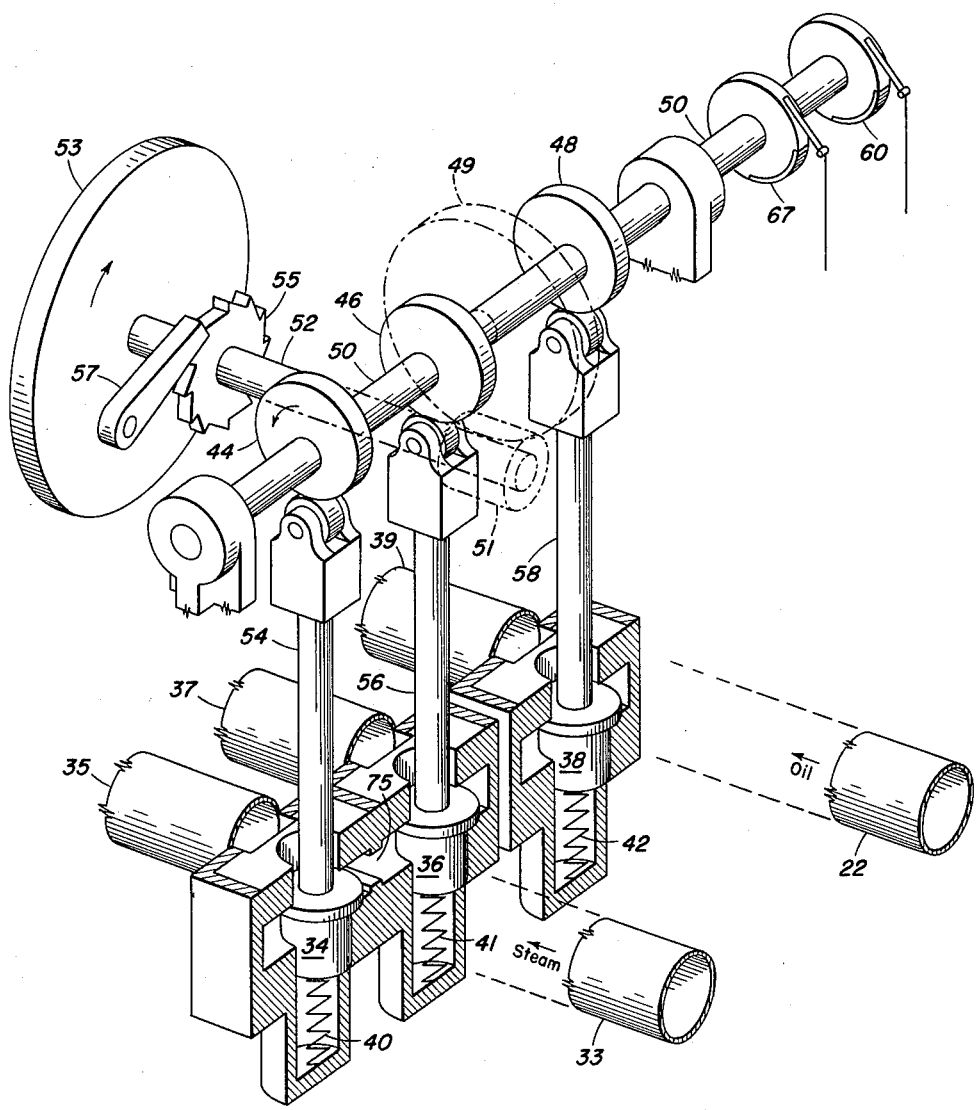

FIG. 5 is a simplified perspective representation of the actuating cams plus drive shaft means with non-reversing ratchet and of other internal parts which make up the three-element valve assemblage of FIGS. 2—3—4; and FIGS. 6a through 6k are a series of cam diagrams indicating how the three valve elements in the assemblage are actuated by their respective governing cams as the shaft by which all of those cams are carried is advanced from its 0° starting point through the successive rotative positions of 90°—120°—150°—180°—210°—240°—270°—300°—330°—360°.

*The Illustrative Steam Generator To Which the Oil Burner Supplies Heat*

Figure 1:
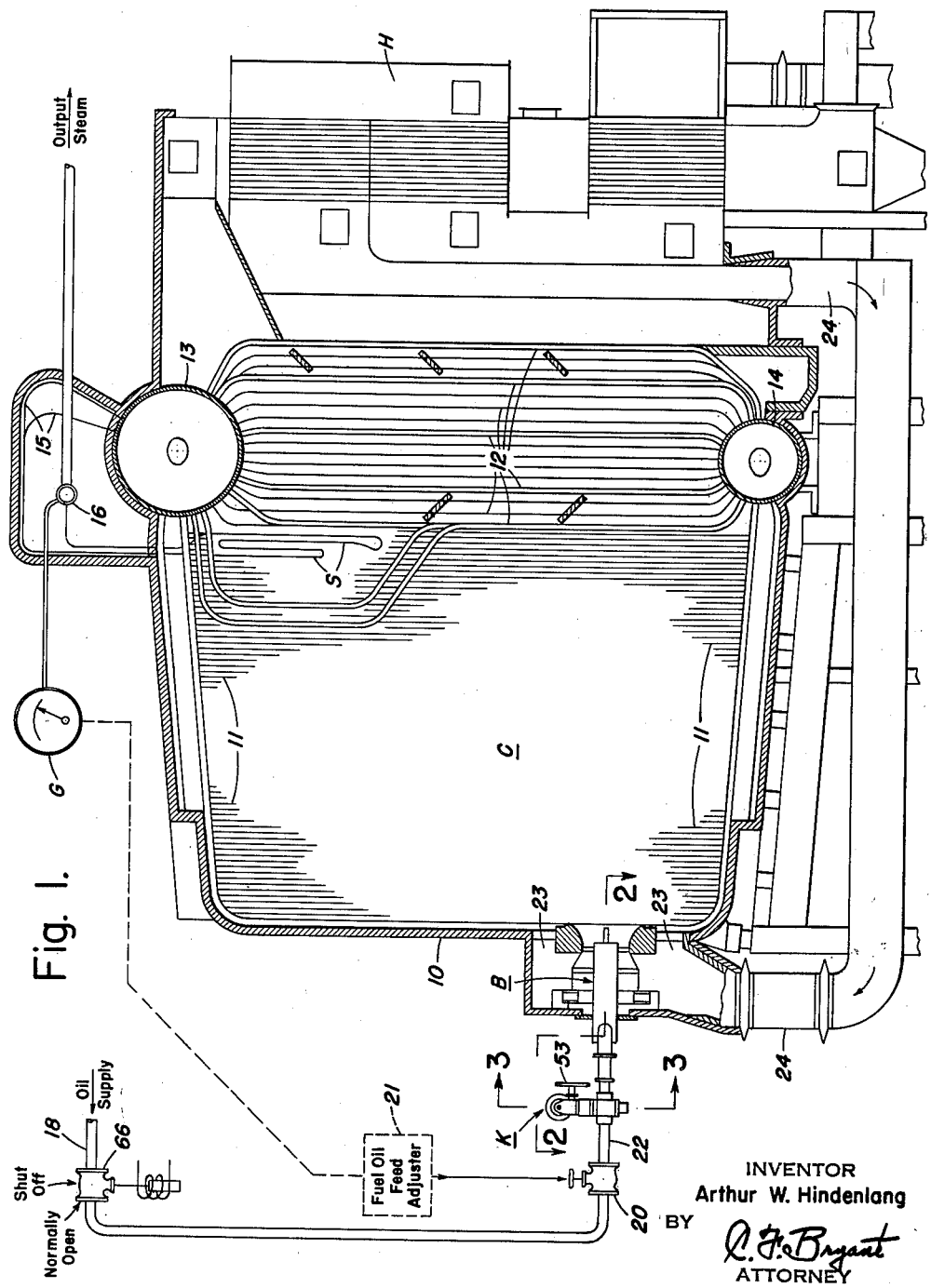
FIG. 1 is a showing in sectional elevation of an atomizing oil burner which is installed in the front wall of a steam generating boiler and which is equipped with the control valve improvements of this invention.

The control valve improvements of my invention are disclosed as being applied to an atomizing oil burner B which FIGS. 1—2 hereof represent as being installed in the front wall 10 of a steam generator furnace so as to fire into the furnace combustion chamber C. This illustrated combustion chamber C of FIG. 1 extends from the front furnace wall 10 rearwardly between spaced left and right sets of side wall lining tubes 11 (only the left set can be seen) to a bank of boiler tubes 12 that interconnect an upper steam and water drum 13 with a lower water drum 14.

Heat released in chamber C by a burning of the atomized fuel oil brought into the furnace by burner B causes the water in tubes 11 and 12 to evaporate into steam; such generated steam is delivered by those evaporator tubes 11—12 into the upper drum 13 and then flows via conduits 15 out of the drum top and into a superheater S; and after having its temperature further raised, the steam leaves superheater S and flows via outlet header 16 into a turbine (not shown) or other point of use.

Supply to burner B of the fuel oil needed to produce the foregoing generation of steam may be from any suitable source designated 18 in FIG. 1. Adjustment of the rate at which this burner B injects the burning oil into chamber C may be effected in any suitable manner as through the medium of an adjuster valve 20. Setting of valve 20 to hold the generated steam pressure, as indicated at gage G, at a desired constant value may be accomplished either manually or automatically, as through the medium of conventional adjuster means indicated generally at 21.

Regardless of whether such adjustment is effected manually or automatically, high steam loadings on the generator will call for corresponding high rates of fuel oil supply to burner B through valve 20; intermediate steam loadings on the generator will call for an intermediate setting of fuel adjuster valve 20; and low steam loadings will require that valve 20 be opened only the small amount needed to supply oil burner B at a correspondingly low rate. In other words, the flow of fuel oil through the supply pipe 18 and burner B is governed in accordance with the steam load on the boiler 10—16 to maintain the desired operating pressure. When the adjustment of valve 20 is effected automatically, the conventional adjuster means 21 (details not shown) will of course act to maintain the aforementioned constant pressure in response to deviation impulses received from gage G.

Air for supporting the combustion of the fuel oil thus burned in the furnace is brought into chamber C through an annular space shown at 23 in FIGS. 1–2 as surrounding the burner B and as communicating with an air supply duct 24. In the installation of FIG. 1 this air so delivered into the furnace by duct 24 is preheated in the usual way by the spent combustion gases which leave the furnace. After passing over the boiler tube bank 12, such spent furnace gases flow through an air heater H on their way to the furnace stack (not shown); and in that device H (which may be of any suitable design) those spent gases transfer some of their remaining heat to the incoming air that enters the supply duct 24 from H and that is delivered by the duct into chamber C through the above mentioned space 23 around burner B.

The complete steam generator installation of FIG. 1 includes further means (not illustrated here) whereby the rate of this combustion air flow through duct 24 is kept substantially matched with the rate at which fuel oil from source 18 is fed into the furnace by way of valve 20 and the burner B. Each time, accordingly, that adjuster 21 changes the setting of fuel valve 20 it similarly adjusts (via conventional means not shown) the rate at which air is received into chamber C from duct 24; and in this way the matching relationship between air feed and fuel feed is maintained throughout the full range of steam loadings on the generator apparatus.

Also included in the installation are conventional means (not shown) for making available at proper times to the supply pipe 33 of FIG. 2 either steam or air or other medium which is under suitable pressure and which is suitable for performing in burner B the "atomizing" function later described.

The Atomizing Oil Burner of FIGS. 1–2

In the installation here illustrated, the atomizing oil burner B is shown as comprising a central tube 26 represented in FIG. 2 as being surrounded by a larger outer casing 27 concentric therewith and spaced therefrom with resultant formation of an annular passage 28 between these two members. The fuel oil to be burned enters this passage 28, from a conduit 29, and flows forwardly therethrough to the nozzle or tip 30 of the burner. Here the oil enters and passes through a plurality of nozzle spray holes 31, each of which directs a small stream of the oil (in emulsified form as described below) into the furnace chamber C.

The aforesaid central tube 26 of the burner has steam or air or other atomizing medium admitted thereinto from some suitable source earlier mentioned as being shown at 33 in FIG. 2. In forcing itself out through the spray holes 31 of nozzle 30, this steam or air atomizing medium encounters the above mentioned streams of fuel oil and in mingling therewith serves to break each of those streams up into minute spray particles. As a result of this "atomizing" action, the fuel oil streams entering furnace chamber C from the nozzle openings 31 are in the form of a fine spray or mist.

Other constructions of atomizing oil burners are of course both possible and known; and as the description hereof proceeds it will become apparent that my below-described new control valve facilities are useable with atomizing burners of such other constructions as well as with the illustrative burner B that is here represented.

My New Control Valve Means for Burner B

In accordance with my invention, there is interposed between the atomizing oil burner B and its oil feed pipe 22 plus steam feed pipe 33 a unique control valve assemblage which FIGS. 1–2 represent generally at K and which FIGS. 3–6 disclose in greater detail.

This new valve assemblage K is brought into action each time that burner B is started up and each time that it is shut down; such assemblage K replaces the plurality of manual valves which heretofore have been utilized in an uncoordinated manner with accompanying danger of furnace explosion or other serious accident; and in performing all necessary functions of burner start up and shut down this assemblage K provides positive assurance that these functions will be accomplished in the same given "safe" sequence at all times and under all circumstances.

Included in this assemblage K are three valve units respectively designated 34, 36 and 38 in each of FIGS. 2, 3, 5 and 6. The first valve unit 34 governs flow of atomizing steam from source 33 into the central tube 26 of burner B by way of the direct connection represented at 35 in FIG. 2; the second valve unit 36 governs the flow of purging steam from source 33 into the annular oil passage 28 of burner B by way of branch connection 37 and elbow conduit 29; and the third valve unit 38 governs flow of fuel oil from pipe 22 into said annular passage 28 of burner B by way of the branch and elbow connections which FIG. 2 shows at 39 and 29.

Serving to hold these valve elements 34, 36 and 38 in the upper or closed positions which FIGS. 3–4–5 show are compression springs designated 40, 41 and 42 in those drawing views; and functioning at proper times to push these valve elements down against said springs to their respective open positions (shown by FIG. 6e for 34 and FIG. 6h for 36 and FIG. 6e for 38) are three cams which are designated 44, 46 and 48 in FIGS. 2, 3, 4, 5 and 6, and all of which are mounted on and secured to a common shaft 50 for rotation therewith.

In the arrangement shown, such rotation is imparted to cam shaft 50 through a gear wheel 49 which also is keyed to the shaft, and with which there meshes a worm gear 51 that is carried by a drive shaft 52. On this drive shaft 52 are mounted a hand wheel 53 plus a ratchet 55 whose associated pawl 57 permits the shaft to be turned by hand wheel 53 only in the single or forward direction indicated by the wheel-53 arrows of FIGS. 3–4–5. Such non-reversible driving movement on the part of shaft 52 means that the main valve shaft 50 together with all three of the cams 44, 46, 48 carried thereby can during operation of the assemblage K be rotated in and only in the single direction that the cam-44 arrows of FIGS. 5 and 6 indicate as counterclockwise.

Each of the stems 54 and 56 and 58 for valve elements 34 and 36 and 38 is individually moveable up and down through a suitable packing 59 between its upper or valve-closed position (shown by FIGS. 3–4–5 for all three valves) and its cam-depressed downward or open positions which FIG. 6d shows for valves 34 and 38 and which FIG. 6h shows for valve 36. Each such downward opening movement is produced by the associated valve cam 44 or 46 or 48 in the manner which the FIGS. 6a–6k cam diagrams reveal very fully; and upon later withdrawal of the cam's actuating surface the valve element is pushed by spring 40 or 41 or 42 upwardly back into its original closed position.

New Valve Assemblage K Assures Safe Burner Start Up and Shut Down Under All Circumstances The mode of operation of my new control valve assemblage K will become most readily apparent upon inspection of the cam diagrams of FIGS. 6a–6k. When the steam generator 10—16 of FIG. 1 is shut down, the cam shaft 50 occupies the 0° position of FIG. 6a wherein all three of the valves 34—36—38 are closed. Under this condition, neither fuel oil from pipe 22 (FIG. 2) nor steam from supply pipe 33 can reach the burner B and it therefore is totally inactive.

In starting up this steam generator of FIG. 1 the furnace chamber C thereof first is freed of any explosive mixtures that may remain therein through a blowing thereinto, via the opening 23 around burner B, of fresh air from supply duct 24. This incoming air carries the original gaseous contents of chamber C out through the boiler bank 12 and to the furnace stack (not shown) by way of the air heater H.

With the furnace thus prepared, an operator at valve assemblage K now turns the hand wheel 53 in the forward and only direction in which movement thereof can take place (see ratchet 55 and pawl 57 of FIGS. 3–4–5) with an accompanying slow rotation of cam shaft 50 in its forward direction (see cam-44 arrows of FIGS. 4–5–6. After passing the 90° position of FIG. 6b, rotative advancement of the cam shaft 50 gradually opens atomizing valve 34 to the intermediate position of FIG. 6c.

At this point shaft 50 has been rotated through 120°; and the purge valve 36 and the fuel valve 38 both still remain closed, as FIG. 6c indicates. The named partial opening of atomizing valve 34 now admits steam from the FIG. 2 source 33 into the central atomizing tube 26 of burner B. This steam jets out through burner nozzle openings 31 and into the furnace chamber C, and in so doing it warms up the atomizer parts and conditions the burner for more ready light off of the fuel oil at the later time when that oil also is admitted. During all of this preliminary period the closed valve 36 prevents steam from flowing into the now-empty fuel oil passage 28.

As the operator continues to turn the handwheel 53 of assemblage K, shaft 50 is further advanced by gear 49 and worm 51 to the 150° position of FIG. 6d, wherein the fuel valve 38 has started to open and the atomizing valve 34 has been opened even more. Fuel oil from pipe 22 now is admitted through valve 38, plus the branch and elbow conduits 39 and 29, into the annular passage 28 of the burner. From here the pressure thereof forces it out of the nozzle openings 31 and into the furnace chamber C, along with the aforementioned atomizing steam which breaks the oil particles up into the fine mist or spray earlier described.

In earlier arriving at the 120° rotative position, valve shaft 50 had caused an igniter control disc shown at 60 in FIGS. 2 and 5 to connect between the energizing conductors 62 and 63 of FIG. 2 a spark transformer 61 with which there are associated gas pilot flame means (not shown) including a gas pilot solenoid valve (also not shown). Thus activated, transformer 61 throws a series of consecutive sparks across the gap between electrodes which are shown by FIG. 2 at 64 and 65 in simplified form and with which the gas pilot means mentioned above are utilized. Being in the path of the atomized fuel oil projecting from burner nozzle 30, these sparks at 64—65 (acting through the aforementioned gas pilot means) ignite that atomized oil and thereby light up the burner B.

In the organization here shown, energization of spark transformer 61 is continued by igniter control disc 60 from the time that the valve cam shaft 50 arrives at said 120° position until it later has been further advanced to near the 180° position of FIG. 6e. During all of this period ignition sparks continue to pass between electrodes 64—65 with resultant activation of the gas pilot flame (not shown) in front of the burner B; and they stop only when valve shaft 50 has been advanced fully into the 180° position of FIG. 6e, at which point the igniter control disc 60 on shaft 50 disconnects spark transformer 61 from the energizing conductors 62—63.

By the time, therefore, that valve shaft 50 has reached the 150° position of FIG. 6d the burner B will, under normal conditions, have been satisfactorily lighted and the atomized fuel oil thus will be burning with a stable flame in furnace chamber C. Once, moreover, such ignition of burner B is established, the atomized fuel oil will keep on burning in chamber C as long as the burner continues to receive both oil and steam through the open valves 38 and 34 of assemblage K.

The result, therefore, of further advancement by the operator of cam shaft 50 to the 180° position of FIG. 6e is to bring both of said fuel and atomizing valves 38 and 34 to their fully opened position; also to cut off, at control disc 60, as earlier mentioned, the energization of spark transformer 61. This 180° position of valve shaft 50 is accordingly the normal operating one; and shaft 50 thus is permitted to remain there undisturbed as long as it is desired to maintain the steam generator 10—16 of FIG. 1 in operation. During such operation the rate of fuel oil feed to burner B is adjusted, by the FIG. 1 valve 20, so as to match the boiler steaming load, as already explained.

*Ignition Proving Facilities for the Burner Installation*

The complete installation of FIGS. 1–2 further includes a flame viewer V at the front of burner B, a normally open shut off valve 66 in the oil supply line 18, a trial-ignition control disc 67 on the shaft 50 of my new valve assemblage K, a timer 68 which is activated by disc 67 at proper times, a relay 70 which opens contact 71 when and only when the viewer V is "seeing" flame, and a solenoid 72 which closes shut off valve 66 when and only when the solenoid is connected between energizing conductors 62—63 via relay contact 71 and a companion contact 73 on the timer 68.

From FIGS. 5 and 2 it will be seen that the trial-ignition disc 67 on valve assemblage shaft 50 is organized to connect timer 68 between energizing conductors 62—63 whenever that shaft 50 is in the range of rotative travel between the 120° position of FIG. 6c (just before the oil valve 38 has started to open) and a point slightly beyond the 180° position of FIG. 6e (where the oil valve 38 is fully open). Such timer 68 energization over control disc 67 thus parallels and extends somewhat beyond the range of shaft 50 rotative positioning during which the spark transformer 61 and gas pilot solenoid valve (not shown) are energized over control disc 60.

These ignition-proving facilities operate during start up of burner B in the manner outlined below. As the cam shaft 50 of valve assemblage K reaches and is advanced beyond the 120° position of FIG. 6c, spark transformer 61 (with its associated gas pilot solenoid valve, not shown) and timer 68 both are initially energized over control discs 60 and 67. This transformer activation produces electrical sparks at gap 64—65; and these sparks acting through the gas pilot flame means ignite the atomized fuel oil that is projected from burner tip 30 as the fuel valve 38 is opened by further advancement of shaft 50 into the 150° position of FIG. 6d, and then on into the 180° position of FIG. 6e (where the shaft remains during normal operation of burner B).

Meanwhile, the above-stated activation of timer 68 begins a timing cycle which after some predetermined period (such as one minute) ends with contact 73 moving upwardly into its closed position. If, in the meantime, burner B has been lighted off as desired, flame viewer V will have registered that fact by causing relay 70 to open contact 71. This opening prevents (see FIG. 2) timer contact 73 from energizing solenoid 72, and thus permits shut off valve 66 to continue in its normally open position. Under these circumstances, the burner B continues to receive fuel oil from source 18 and thus supplies heat to the FIG. 1 steam generator 10—16 in the desired manner.

If, however, burner B fails to be lighted during the start-up cycle described immediately above, flame viewer V will not pick up relay contact 71; and solenoid 72 then will be energized over timer contact 73 at the end of the one-minute (or other preselected) period for which timer 68 is set. Such energization over picked up contact 73 causes solenoid 72 to close shut off valve 66 with accompanying stoppage in the flow of fuel oil into burner B from pipe 22.

Once initiated in this manner, such fuel stoppage continues as long as the shaft 50 of valve assemblage K remains in the 180° position of FIG. 6e, wherein trial-ignition disc 67 on shaft 50 keeps timer 68 connected between the energizing conductors 62 and 63. The only way in which flow of fuel oil to burner B then can be restored is for the operator at assemblage K to advance shaft 50 on through the successive rotative positions of FIGS. 6f through 6k, and thereafter repeat the burner starting cycle which has just been described.

After burner B is in stable operation following a satisfactory lighting thereof (either on an initial try or a subsequent try), these ignition-proving facilities of FIG. 2 further are effective to detect loss of burner flame in chamber C and then to close fuel shut off valve 66 in response to such loss.

As long as valve shaft 50 remains in the normal-operation 180° position of FIG. 6e, the timer 68 holds its contact 73 continually closed. Hence if loss of the flame from burner B does occur, such loss permits flame viewer V to release relay contact 71 and thereby connect solenoid 72 across energizing conductors 62 and 63; and that connection produces closure of shut off valve 66 and stoppage in the fuel oil to burner B.

Once this happens, the only way in which flow of oil to the burner can be restored is for the operator at assemblage K to rotate valve shaft 50 on through the successive positions of FIGS. 6f–6k, and thereafter repeat the burner starting cycle by once more advancing shaft 50 from the 0° position of FIG. 6a to the 180° position of FIG. 6e.

*Assemblage K Shut Down of Burner B*

With the shaft 50 of assemblage K in this 180° position of FIG. 6e (which is the position occupied during normal operation of burner B), shut down of the burner is effected by further advancing that shaft 50 on through the successive rotative positions of FIGS. 6f through 6k.

First result of such advancement is to start a closing of the oil valve 38 (FIG. 6g) and thus begin shutting off the flow of fuel from pipe 22 into the burner oil passage 28. Under this FIG. 6g condition (wherein fuel valve 38 still is partly open), steam from source 33 continues to flow through valve 34 into the burner atomizing tube 26; and also into the oil passage 28 through purge valve 36 which now has started to open and the intake side of which communicates with steam pipe 33 through the tie passage designated 75 in each of FIGS. 2, 5 and 6g. Flow of the purging steam into and through the burner fuel tube 26 preferably is somewhat throttled; and in the arrangement shown this is accomplished by shaping cam 46 so that purge valve 36 never opens as fully as does the atomizing valve 34 (see FIGS. 6e–f–g–h–i).

The FIG. 6g simultaneous flow of steam into the central tube 26 by way of connection 35 (see FIGS. 2 and 6) and into the fuel passage 28 by way of connections 37 and 29 effects a "purging" which carries residual fuel oil out of the burner B by way of nozzle openings 31. Such purging continues as shaft 50 is further advanced into the 270° position of FIG. 6h, where fuel valve 38 has been fully closed and purging valve 36 has been fully opened (with atomizing valve 34 still being partly open); and also as shaft 50 is additionally advanced into the 300° position of FIG. 6i, where atomizing valve 36 has been partially closed. In the last two of these three shaft-50 positions (FIGS. 6g–6h–6i) the fuel valve 38 remains fully closed, so that no fuel oil can enter the burner during the latter stages of this purging; and such sequence assures that flame is present at burner B to safely ignite residual oil forced into the furnace during the early stages of the purging action.

Further advancement of the assemblage K shaft 50 into the 330° position of FIG. 6j completes the closure of purge valve 36; and it, along with the atomizing valve 34 and the fuel valve 38, continues to be fully closed as shaft 50 still further is advanced into the 360° position of FIG. 6k. This of course is the same as the 0° position of FIG. 6a; and arrival of shaft 50 therein reconditions valve assemblage K for accomplishment of another cycle of burner start up.

To effect such new start up cycle, the assemblage shaft 50 is once more advanced through the 90°–120°–150° positions of FIGS. 6a–6b–6c, and into the 180° position of FIG. 6e. This latter position is maintained as long as it is desired that burner B supply heat to the FIG. 1 steam generator 10—16.

*Summary*

The earlier explained freedom (brought about by ratchet 55 and pawl 57) on the part of the shaft 50 of assemblage K to be rotated only in the forward direction (indicated by the cam-44 arrows of FIGS. 4–5) assures that the above-described "safe" sequence of openings and closings by valves 34 and 36 and 38 must be followed without deviation during each start up of the burner B and during each shut down thereof; and because of this my new valve assemblage K effectively eliminates the danger of furnace explosion and of other accident hazards which heretofore have been present during the start up and shut down of an atomizing oil burner such as herein illustrated at B.

Moreover, my cooperative use with the new valve assemblage K of the flame viewer V plus the shut off valve 66 and associated facilities further safeguards the burner B from injecting dangerous quantities of unburned fuel oil into furnace chamber C in the event that the burner fails to ignite properly during its start up cycle.

Even though my new control valve assemblage K has been explained in connection with a single burner B of the atomizing oil type, it will be evident that the same novel valve organization also can be utilized with comparable advantage in installations (boiler furnace or other) wherein two or more such burners are employed. In such a situation there will be provided for each of the several burners B a valve assemblage K plus associated safety facilities which serve that and only that burner.

My inventive improvements are therefore capable of wide application and hence are not to be restricted either to the specific form or to the specific utilization herein shown by way of illustration.

What I claim is:

Apparatus for starting up and shutting down an atomizing oil burner which has a nozzle in communication both with an oil passage that is adapted to receive fuel oil from a source of oil supply and with an atomizing passage that is adapted to receive an atomizing medium from a source of medium supply, start up and shut down valve means for said burner in the form of a unitary assemblage that includes an atomizing valve intermediate the burner atomizing passage and its medium source plus a purge valve element intermediate said atomizing medium source and the burner oil passage plus a fuel valve element intermediate said burner oil passage and its fuel oil source, each of said valve elements normally being maintained in the closed position, ignition means for said burner, a valve-actuating shaft carrying three valve-opening cams that are respectively associated with said three valve elements, and further carrying means to energize said ignition means, said cams being shaped in such manner and said means to energize said ignition means being positioned such that upon forward advancement of said shaft through a "burner start up" range of rotation said atomizing valve first is opened and then said fuel valve also is opened along with simultaneous energization of said ignition means, and that upon further forward advancement of the shaft through a "burner shut down" range of rotation said fuel valve first is reclosed and said purge valve then is opened and said atomizing valve thereafter is reclosed and said purge valve likewise is reclosed, means preventing backward movement of said shaft, whereby each and every "start up" actuation and each and every "shut down" actuation of the three valve elements and the energization of said ignition means must proceed in the "safe" sequence that is outlined above, a normally open shut off valve between said fuel oil source and said unitary valve assemblage, an ignition-proving timer organized to begin a timing cycle when the said assemblage cam shaft arrives at an intermediate point in its said range of "start up" rotation, a flame viewer for said burner organized to detect when flame is being admitted from the burner, and means jointly governed by said timer and said flame viewer for closing said shut off valve at the end of said timing cycle if flame from said burner then is not being detected by said viewer with resultant protection to said furnace from having dangerous quantities of unburned fuel oil introduced thereinto.

References Cited in the file of this patent

UNITED STATES PATENTS

| | | |
|---|---|---|
| 1,982,562 | Williams | Nov. 27, 1934 |
| 2,519,889 | Crawford | Aug. 22, 1950 |
| 2,689,000 | Musat et al. | Sept. 14, 1954 |
| 2,720,916 | Spackman | Oct. 18, 1955 |
| 2,874,763 | Hobbs | Feb. 24, 1959 |

FOREIGN PATENTS

| | | |
|---|---|---|
| 587,923 | Great Britain | May 8, 1947 |